US008831914B2

(12) United States Patent
Shen et al.

(10) Patent No.: US 8,831,914 B2
(45) Date of Patent: Sep. 9, 2014

(54) PSEUDO-PHYSICAL MODELING OF DRAWBEAD IN STAMPING SIMULATIONS

(75) Inventors: Yinong Shen, Canton, MI (US); Feng Ren, Canton, MI (US); Zhiyong Cedric Xia, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 400 days.

(21) Appl. No.: 13/439,267

(22) Filed: Apr. 4, 2012

(65) Prior Publication Data
US 2013/0268243 A1  Oct. 10, 2013

(51) Int. Cl.
*G06F 17/50* (2006.01)
*B21D 22/00* (2006.01)

(52) U.S. Cl.
CPC ........ *G06F 17/5018* (2013.01); *G06F 2217/42* (2013.01); *B21D 22/00* (2013.01)
USPC .......................................................... 703/1

(58) Field of Classification Search
None
See application file for complete search history.

(56) References Cited

U.S. PATENT DOCUMENTS

| | | | |
|---|---|---|---|
| 5,379,227 A * | 1/1995 | Tang et al. | 700/98 |
| 5,390,127 A * | 2/1995 | Tang et al. | 700/146 |
| 5,731,816 A | 3/1998 | Stewart et al. | |
| 6,785,640 B1 | 8/2004 | Lu et al. | |
| 6,947,809 B2 | 9/2005 | Ren et al. | |
| 7,117,065 B1 | 10/2006 | Xia et al. | |
| 7,464,011 B2 | 12/2008 | Ren et al. | |
| 7,623,939 B2 * | 11/2009 | Hillmann et al. | 703/1 |
| 8,511,172 B2 * | 8/2013 | Smith | 73/760 |
| 2011/0271775 A1 | 11/2011 | Smith | |

FOREIGN PATENT DOCUMENTS

| | | |
|---|---|---|
| JP | 2004050253 | 2/2004 |
| JP | 2005193292 | 7/2005 |
| JP | 2005329411 | 12/2005 |

OTHER PUBLICATIONS

Shuhui, Li, et al. "An Improved Equivalent Drawbead Model and Its Application" J. Materials Processing Tech., vol. 121, pp. 308-312 (2002).*
Carleer, Bart "Equivalent Drawbead Model in Finite Element Simulations" U. of Twente (1996).*
Bae, G.H., et al. "Simulation-Based Prediction Model of the Draw-Bead Restraining Force and its Application to Sheet Metal Forming Process" J. of Materials Processing Tech., vol. 187-188, pp. 123-127 (2007).*

(Continued)

*Primary Examiner* — Kamini S Shah
*Assistant Examiner* — Jay B Hann
(74) *Attorney, Agent, or Firm* — Damian Porcari; MacMillan, Sobanski & Todd, LLC

(57) ABSTRACT

The stamping of a metal sheet within a stamping die is simulated. The die includes a drawbead running perpendicular to a draw direction. A plurality of successive states are generated for iteratively representing the metal sheet from a blank shape to a final stamped shape. The drawbead is represented as a two-dimensional flat band within a model of the stamping die. Forces acting on the metal sheet are calculated at each successive state to define a next successive state. The calculating step includes a restraining force of the drawbead acting on the metal sheet calculated in response to a predetermined function of a length of the metal sheet engaged in the flat band in respective states. The particular width and location of the flat band achieve improved accuracy of estimating the restraining force.

12 Claims, 6 Drawing Sheets

(56) References Cited

OTHER PUBLICATIONS

Alves, J.L., et al. "Modeling Drawbeads in Deep Drawing Simulations" European Conf. on Computational Mechanics, Solids, Structures and Coupled Problems in Engineering, pp. 533 (2006).*

L.M. Smith et al., A Draw Bead Simulator for a Plurality of Binder Angles, Numisheet 2008, Sep. 1-5, 2008, Interlaken, Switzerland, pp. 439-442.

G.H. Bae et al., Simulation-Based Prediction Model of Draw-Bead Restraining Force and Normal Force, Numisheet 2008, Sep. 1-5, 2008, Interlaken, Switzerland, pp. 443-448.

Yinghong Peng et al., Computer Simulation of Sheet Metal Forming and Drawbead Effects Using eta/Dynaform, 6th International LS-DYNA Conference (2000), pp. 13-1 to 12-7.

Xionghui Zhou et al., Equivalent Drawbead and its Application in Optimization of Autobody Forming Process, 6th International LS-DYNA Conference (2000), pp. 14-13 to 14-18.

Meinders, T. and Geijselaers, J.J.M. and Huetink, J. (1999) Equivalent drawbead performance in deep drawing simulations. In: Numisheet conference, 1999.

* cited by examiner

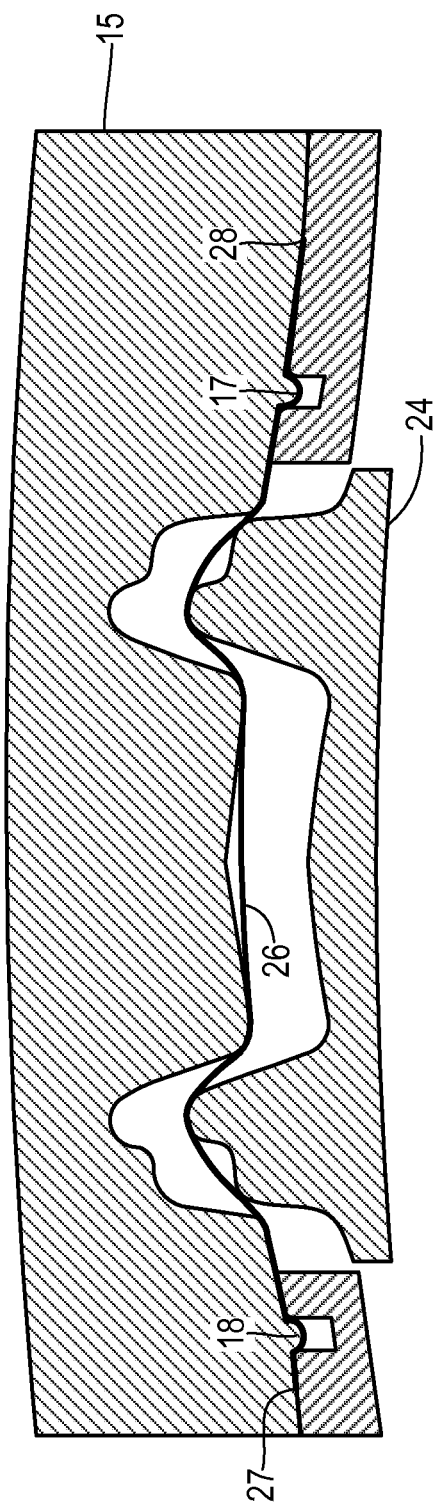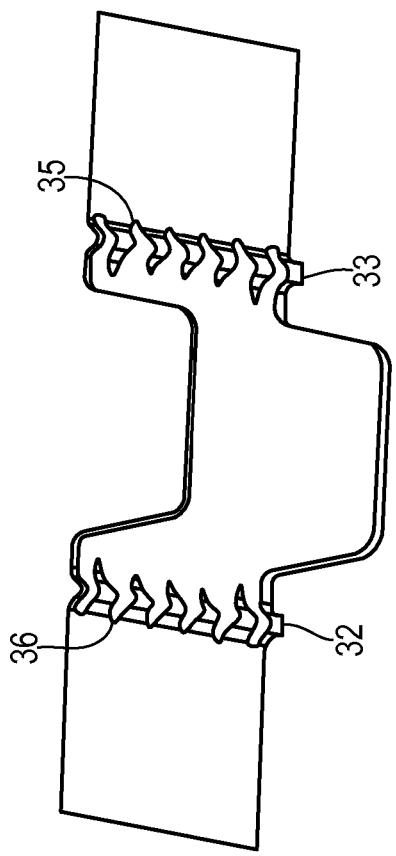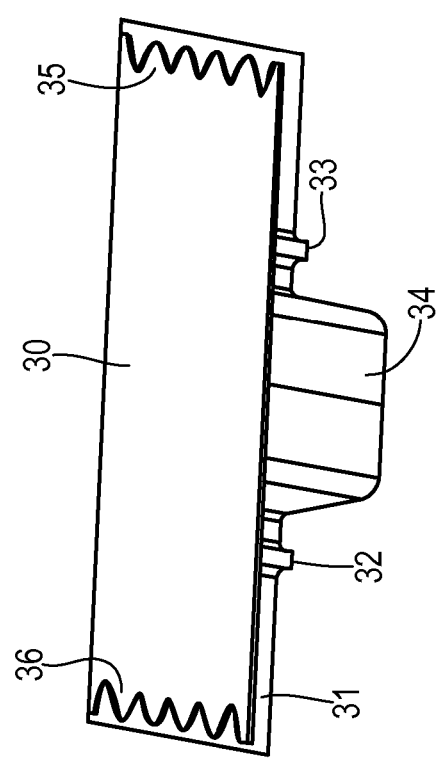

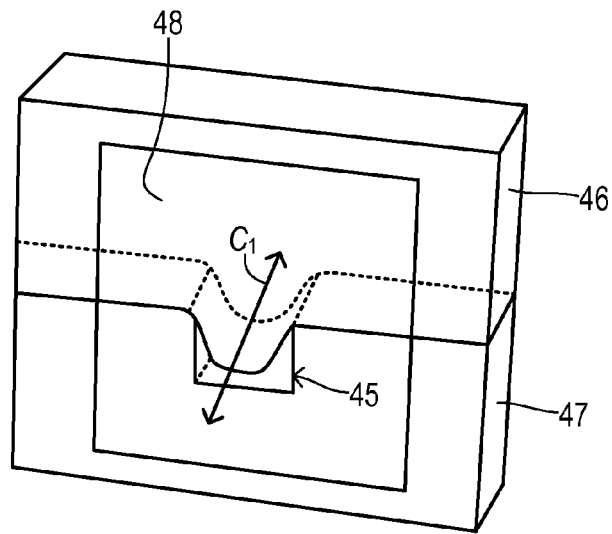
Fig. 11
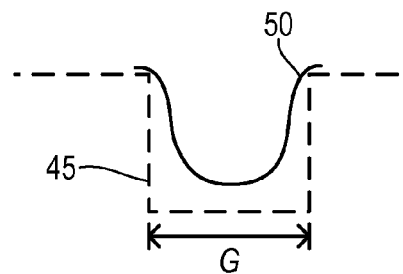
Fig. 12
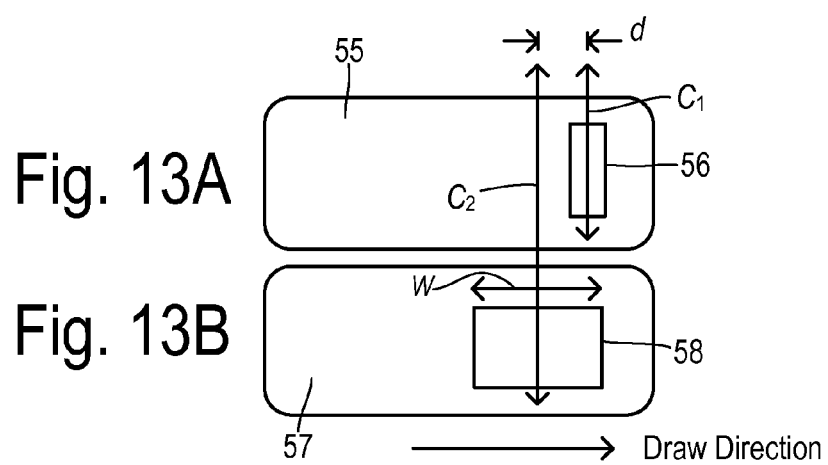
Fig. 13A
Fig. 13B
Draw Direction

US 8,831,914 B2

PSEUDO-PHYSICAL MODELING OF DRAWBEAD IN STAMPING SIMULATIONS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to simulating a metal stamping process, and, more specifically, to providing a two-dimensional modeling of the restraining forces created by a drawbead that is accurate and computationally efficient.

The purpose of a drawbead in a typical stamping process is to provide a restraining force that helps control material flow when a metal sheet or blank is deformed into the shape of the die. There are two stages in a typical draw (i.e., stamping) process: binderset and die closure. In binderset, upper and lower blankholders close up against the blank to initiate the restraining force. In die closure, the blank is drawn or punched into the die cavity and deformed into the shape of the die. A drawbead consists of a male and a female side that is mounted separately to upper and lower holders. When the two holders move to a closed position in the binderset phase, the two sides of the drawbead engage the blank and then deform the metal sheet into the bead. The drawbead then remains fully engaged during the die closure phase. As the blank is forced into the die cavity, the metal flows through the drawbead. The sheet metal undergoes stretching and bending deformations, moving against friction to create a restraining force acting on the metal flow.

The restraining force generated by a drawbead changes throughout the entire binderset process. It reaches its maximum as the drawbead becomes fully engaged with sheet metal all around. Thus, the restraining force ramps up to a maximum value at the end of the binderset phase, and it keeps this value throughout the die closure phase until the blank edge (i.e., outline) moves into the drawbead. At that point, the force decreases according to the portion of the metal sheet still engaging the drawbead. Because of the desire to keep material utilization high and minimize scrap, stamping processes are often designed so that the blank outline partially or completely flows into and through the drawbead.

When developing a stamping process and the tooling and the metal blanks to be used, various computer aided engineering (CAE) tools are often used to analyze candidate designs and to optimize them. One particular example of a method and apparatus for analyzing a stamping process is shown in U.S. Pat. No. 5,379,227, entitled "Method for Aiding Sheet Metal Forming Tooling Design," which is incorporated herein by reference in its entirety. It is imperative for CAE engineers to accurately simulate the forces acting during the stamping process in order to properly choose an initial blank design that results in a desired final stamped shape while minimizing the outline of the blank. In conventional models, a line bead has been used to simulate a real drawbead due to its computational efficiency over a full three-dimensional model. In the line bead model, a drawbead centerline and its strength have been used to define a real drawbead's location and its maximum restraining force. This model remained fixed during a complete simulation. The prior models fail to simulate the force changes either during initial drawbead engagement or during movement of a blank edge into the drawbead. It would be desirable to simulate these force changes while remaining computationally efficient.

SUMMARY OF THE INVENTION

In one aspect of the invention, a method is provided for simulating the stamping of a metal sheet within a stamping die including a drawbead having a gap G, a height H, and a centerline $C_1$ substantially perpendicular to a draw direction in which the metal sheet flows through the drawbead. A plurality of successive states are generated for iteratively representing the metal sheet from a blank shape to a final stamped shape. The drawbead is represented as a two-dimensional flat band with a width W and a centerline $C_2$. The three-dimensional drawbead defines a curve at the intersection of the drawbead with a plane perpendicular to centerline $C_1$, wherein width W is equal to the length of the curve. Centerline $C_2$ is parallel with centerline $C_1$ and is offset from centerline $C_1$ by a distance d substantially equal to $(W-G)/2$. Forces acting on the metal sheet are calculated at each successive state to define a next successive state. The calculating step includes a restraining force of the drawbead acting on the metal sheet calculated in response to a predetermined function of a length of the metal sheet engaged in the flat band in respective states.

BRIEF DESCRIPTION OF THE DRAWINGS

FIG. 4 is a cross-sectional view later during the die closure phase.

FIG. 5 is a perspective view showing a flat blank placed on a stamping die prior to stamping.

FIG. 6 is a perspective view of the stamped part with a final stamped shape.

FIG. 11 is a diagram for defining a two-dimensional representation of the drawbead.

FIG. 12 shows a curve useful in deriving a flat band representing the drawbead.

FIGS. 13A and 13B represent a planned view of a three-dimensional drawbead and a two-dimensional flat band in a die surface model, respectively.

DETAILED DESCRIPTION OF PREFERRED EMBODIMENTS

Figure 1:
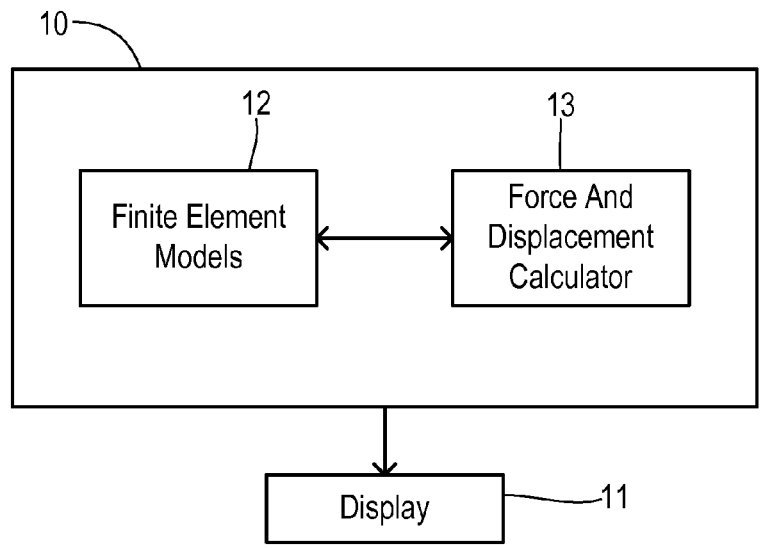
FIG. 1 is a block diagram showing prior art apparatus for simulating a stamping process.

Referring now to FIG. 1, computer apparatus for performing a conventional stamping simulation includes a processing unit 10 and a display 11. The processing unit implements finite element models 12 to represent the tooling structures and the sheet metal component during various stages of the stamping process. Processor 10 also implements a force and displacement calculator 13 for interacting with finite element models 12 to iteratively determine the changing shape of the metal sheet during the complete stamping process according to the response of the metal sheet to the forces being applied to it. The changing shape and other details of the simulation are shown to a user on display 11.

Figure 2:
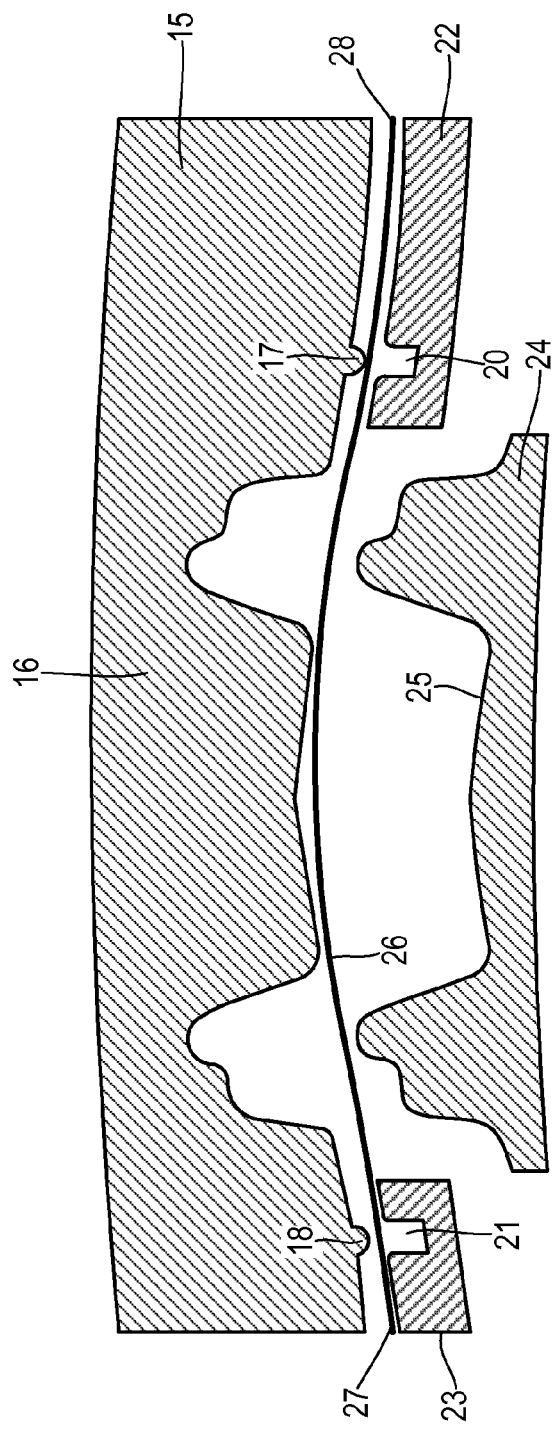
FIG. 2 is a cross-sectional view of a stamping process at the beginning of the binderset phase.
Figure 3:
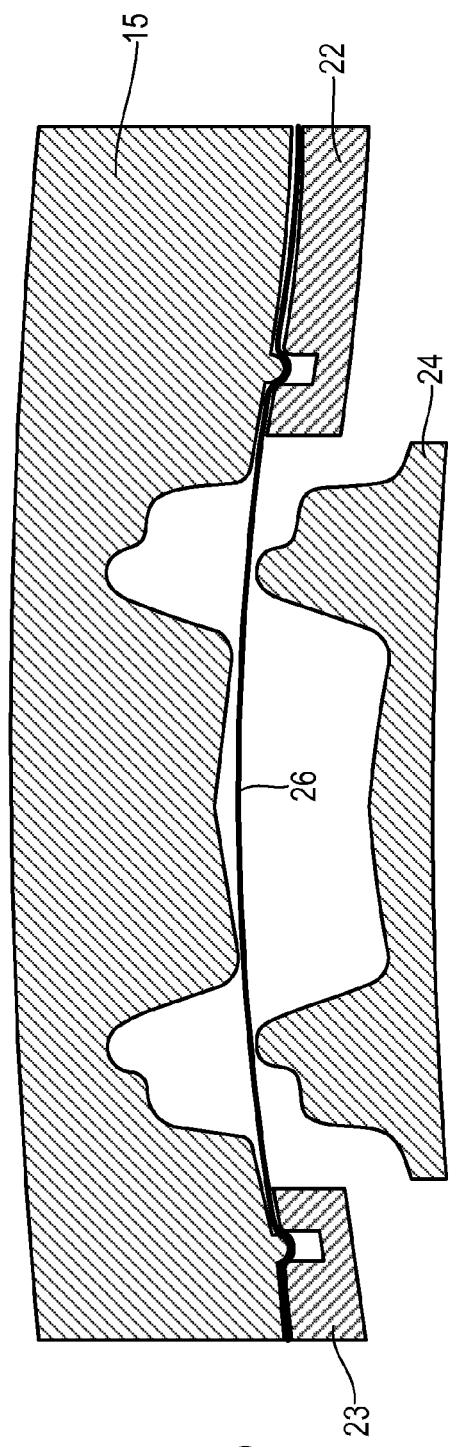
FIG. 3 is a cross-sectional view of stamping dies and a metal sheet at the beginning of a die closure phase.

A typical stamping process is shown in greater detail in FIGS. 2-4. An upper die 15 has a punch portion 16 and upper drawbead portions 17 and 18 for drawbeads on opposite sides of the tool. Drawbead portions 17 and 18 protrude from upper die 15 in the direction of drawbead cavities 20 and 21 in lower blankholders 22 and 23, respectively. A lower die 24 includes a die cavity 25 complementary with punch 16. A metal sheet or blank 26 is loaded between upper and lower dies 15 and 24 and has an outline with opposite edges 27 and 28. FIG. 2 shows the initially loaded position of blank 26, and FIG. 3 depicts the completion of the binderset stage when the drawbeads are fully engaged.

As shown in FIG. 4, lower die 24 continues to approach upper die 15 during the die closure phase, resulting in ends 27 and 28 approaching the respective drawbeads as blank 26 is drawn into the shape of the die surfaces.

FIGS. 5 and 6 further illustrate the stamping process with the upper die removed for clarity. A metal blank 30 is formed into a desired shape by stamping in a stamping die 31 having drawbeads 32 and 33 on opposite sides of a die cavity 34. Blank 30 has outlines 35 and 36 that flow at least partially through drawbeads 32 and 33 during stamping as shown in FIG. 6. Outlines 35 and 36 may have a wavy shape as shown in order to reduce the amount of blank material required, since the edges are typically removed as scrap after stamping.

Figure 7:
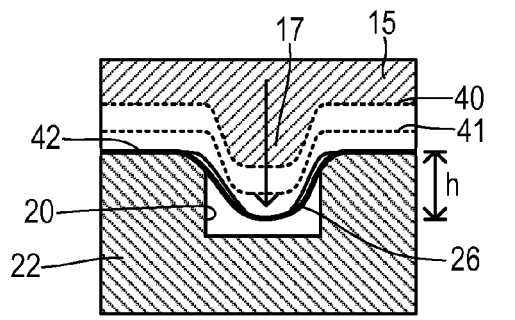
FIG. 7 is a cross-section showing progression into a drawbead during binderset.
Figure 8:
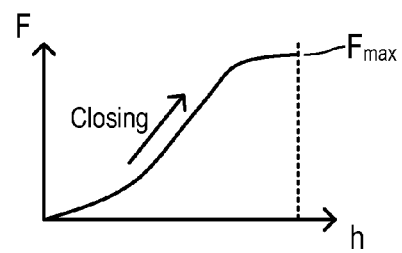
FIG. 8 is a graph showing the relationship between restraining force and the penetration into the drawbead during binderset.

Modeling of the stamping process takes into account drawbead penetration height during the binderset phase as shown in FIG. 7. As upper die 15 progressively moves into positions 40, 41, and 42, die protrusion 17 has a penetration height h into drawbead cavity 20. Height h goes from zero up to a maximum penetration height H determined by the geometry of protrusion 17 and cavity 20. As shown in FIG. 8, during closing in the binderset phase an increasing restraining force is created as penetration height h increases. A maximum force $F_{max}$ is obtained at the maximum penetration height H. The actual force depends upon the material properties of the metal sheet and the stamping die, the frictional condition between the metal sheet and the stamping die, and the geometry of the drawbead. Using known techniques, the relationship in FIG. 8 is obtained in a conventional manner.

Figure 9:
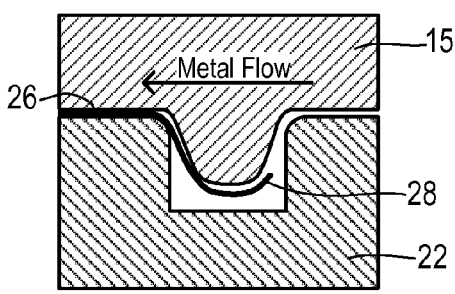
FIG. 9 is a cross-section showing flowing of the metal sheet through the drawbead during die closure, with the sheet edge or outline moving through the drawbead.
Figure 10:
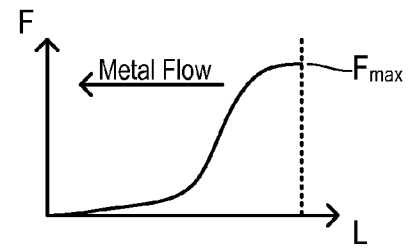
FIG. 10 is a graph showing a relationship between restraining force and the proportion of the drawbead engaging the metal sheet during die closure.

During the subsequent die closure phase, the restraining force begins at maximum $F_{max}$ and remains at maximum until a blank edge moves into the drawbead as shown in FIG. 9. As metal sheet 26 flows through the drawbead, edge 28 passes through so that a length L measured from edge 28 to the inside edge of the drawbead is decreasing. As shown in FIG. 10, restraining force F falls from maximum force $F_{max}$ at a full engagement length L to a zero restraining force when engaged length L falls to zero. Once again, the actual force depends upon the material properties of the metal sheet and the stamping die, the frictional condition between the metal sheet and the stamping die, and the geometry of the drawbead. Using known techniques, the relationship in FIG. 10 is obtained in a conventional manner.

Rather than constructing a three-dimensional computationally intensive model, the present invention uses a two-dimensional representation of the drawbead derived according to the relationships shown in FIG. 11. An actual drawbead 45 being modeled is located between an upper die 46 and a lower holder 47 and has a centerline $C_1$. Centerline $C_1$ is perpendicular to the draw direction in which the metal sheet flows through drawbead 45 and is midway between opposite ends of drawbead 45. A plane 48 is taken perpendicular to centerline $C_1$ at a point where it intersects drawbead 45. The intersection of drawbead 45 and plane 48 defines a curve 50 as shown in FIG. 12. Curve 50 spans a gap G of drawbead 45. Curve 50 has a length as would be measured after stretching into a straight line that corresponds to a maximum potential engagement surface with the metal sheet as it flows through drawbead 45. The full engagement length of curve 50 provides a width W for a two-dimensional flat band representing the drawbead as described below.

FIG. 13A shows an actual surface 55 of a die being modeled which includes an actual drawbead 56 having centerline $C_1$. FIG. 13B shows a corresponding modeled surface 57 of the die which includes a flat band 58 to represent the drawbead, wherein flat band 58 has a width W corresponding to the length of curve 50 as determined in accordance with FIGS. 11 and 12. Flat band 58 has a centerline $C_2$ which is parallel with centerline $C_1$. Flat band 58 is located in the surface model at a position such that its centerline $C_2$ is offset from centerline $C_1$ (as projected into the two-dimensional surface model) by a distance d, wherein d is substantially equal to $(W-G)/2$. For portions of the metal sheet located within flat band 58 during a simulation, a force determination can be performed according to the relationships shown in FIGS. 8 and 10. Those relationships together with the particular placement of flat band 58 provide both an accurate estimate of the forces and computational efficiency.

Figure 14:
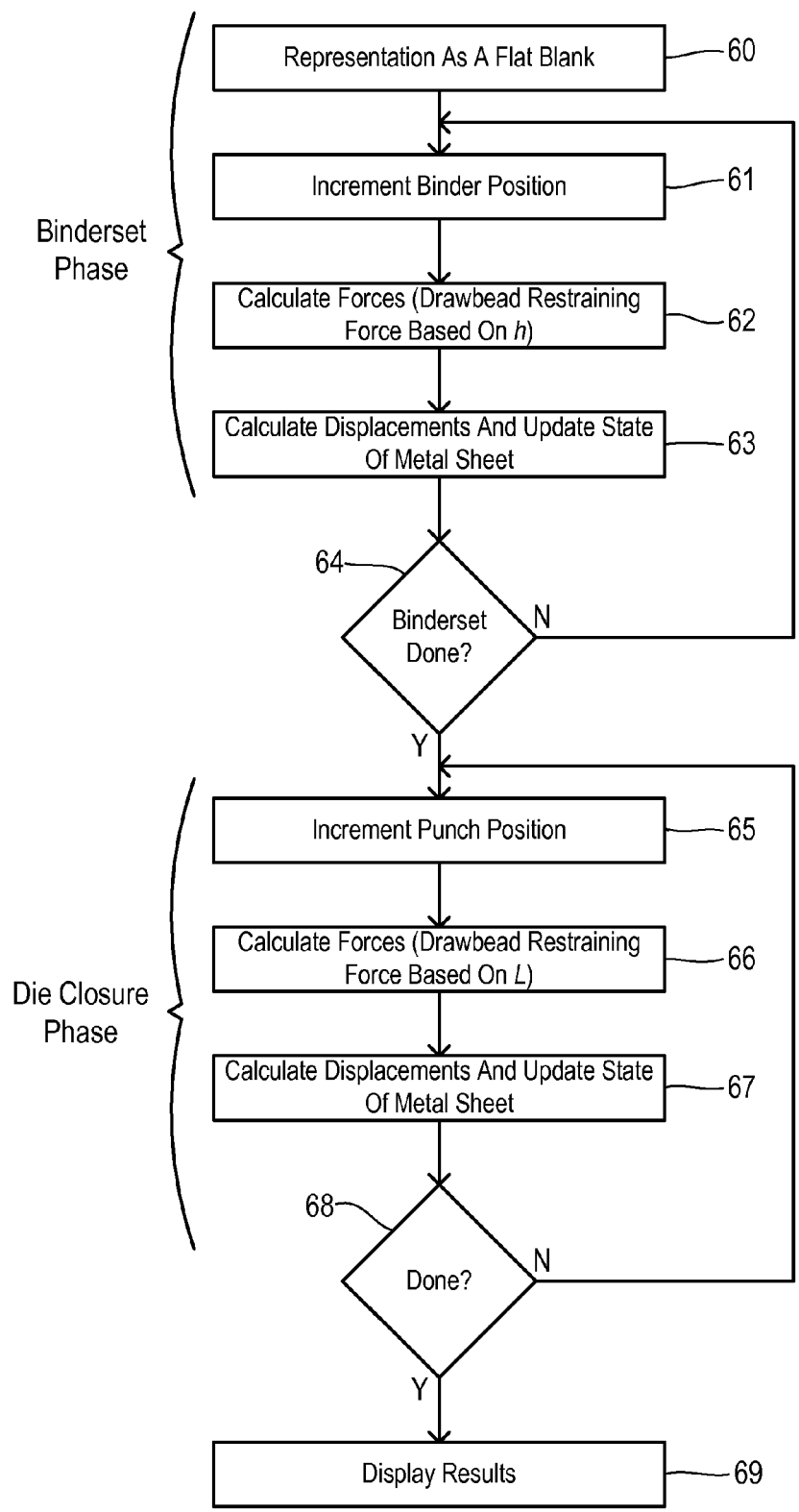
FIG. 14 is a flowchart showing one preferred method of the present invention.

A preferred method of the invention is shown in FIG. 14. In step 60, the metal sheet is initially represented as a flat blank. In the binderset phase, the holder dies are moved until they achieve full engagement (and the main punching surfaces do not engage and there is no significant flow of the metal sheet. A binder position of the holder dies is incremented in step 61. Based on the amount of movement, all forces acting on the metal sheet are calculated in step 62 including the calculation of a drawbead restraining force that is based on penetration height h. Displacements occurring as a result of the forces are calculated in step 63 and the state (i.e., shape) of the metal sheet is updated. A check is made in step 64 to determine whether the binderset phase has completed. If not, then a return is made to step 61 for determining the result of the next incremental movement of the binder.

Upon completion of the binderset phase, the die closure phase begins at step 65 wherein the punch die position is incremented by a predetermined step size. The resulting forces acting on the metal sheet are calculated in step 66, including a drawbead restraining force determined in response to a length L the engages the flat band (i.e., the effective zone). In step 67, displacements of respective points on the metal sheet are calculated and the resulting state or shape of the metal sheet is updated. A check is made in step 68 to determine whether die closure has completed. If not, then a return is made to step 65 for the next increment. Otherwise, results of the simulation are displayed to a user in step 69.

Figure 15:
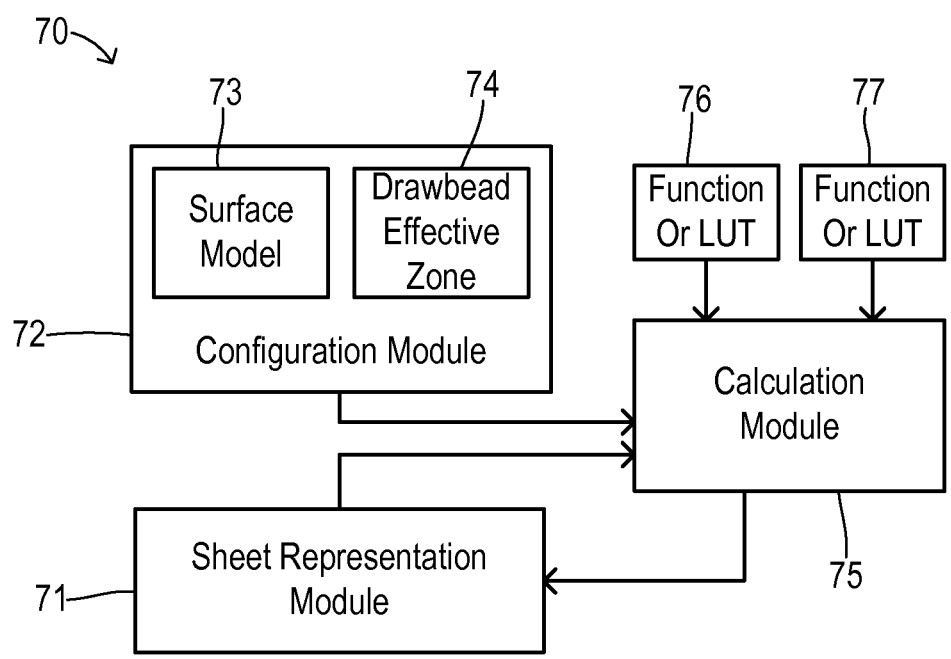
FIG. 15 is a block diagram showing a simulator in one preferred embodiment of the invention.

FIG. 15 shows a simulator system 70 in accordance with one embodiment of the present invention. A sheet representation module 71 includes a memory for storing representations of a plurality of successive states of the metal sheet. A configuration module 72 includes a conventional surface model 73 representing surfaces of the tooling dies along with information relating to their movements during a stamping cycle. Configuration module 72 further includes a drawbead representation 74 for storing a representation of the drawbead as a two-dimensional flat band as described above.

A calculation module 75 is coupled to sheet representation module 71 for receiving a current state of the metal sheet and is coupled to configuration module 72 for determining the interaction of a current state with the tooling surfaces and with the flat band representation of the drawbead. For calculating the restraining force of the drawbead acting on the metal sheet, calculation module 75 includes function/look-up tables (LUT) 76 and 77. Function/LUT 76 stores the relationship between penetration height and restraining force during the binderset phase as shown in FIG. 8. Function/LUT 77 stores the restraining force relationship used during the die closure phase as shown in FIG. 10. Either a mathematical representation of the functions or pre-calculated look-up tables can be employed.

What is claimed is:

1. A method of simulating the stamping of a metal sheet within a stamping die including a drawbead having a gap G, a height H, and a centerline $C_1$ perpendicular to a draw direction in which the metal sheet flows through the drawbead, comprising the steps of:
    iteratively representing the metal sheet in a plurality of successive states from a blank shape to a final stamped shape;
    representing the drawbead as a two-dimensional flat band with a width W and a centerline $C_2$, wherein the drawbead defines a curve at the intersection of the drawbead with a plane perpendicular to centerline $C_1$, wherein width W is equal to the length of the curve; and wherein centerline $C_2$ is parallel with centerline $C_1$ and is offset from centerline $C_1$ by a distance d of (W−G)/2; and
    calculating forces acting on the metal sheet at each successive state to define a next successive state;
    wherein the calculating step includes a restraining force of the drawbead acting on the metal sheet calculated in response to a predetermined function of a length of the metal sheet engaged in the flat band in respective states.

2. The method of claim 1 wherein the predetermined function varies between a predetermined maximum force and zero, wherein the predetermined maximum force is determined prior to simulating the stamping according to material properties of the metal sheet and the stamping die and a geometry of the drawbead.

3. The method of claim 1 wherein the plurality of successive states includes a binderset phase and a die closure phase, and wherein the calculation of the restraining force of the drawbead acting on the metal sheet responsive to the predetermined function of the length of the metal sheet engaged in the flat band is performed in the die closure phase.

4. The method of claim 3 further comprising the step of defining a penetration height h of the drawbead corresponding to each state in the binderset phase;
    wherein the calculating step includes a restraining force of the drawbead acting on the metal sheet calculated during the binderset phase in response to a second predetermined function of the penetration height h.

5. The method of claim 4 wherein the second predetermined function varies between zero and a predetermined maximum force, wherein the predetermined maximum force is determined prior to simulating the stamping according to material properties of the metal sheet and the stamping die and a geometry of the drawbead.

6. A simulator for simulating the stamping of a metal sheet within a stamping die including a drawbead having a gap G, a height H, and a centerline $C_1$ perpendicular to a draw direction in which the metal sheet flows through the drawbead, comprising:
    a first finite element model that iteratively models the metal sheet in a plurality of successive states from a blank shape to a final stamped shape;
    a second finite element model that models the drawbead as a two-dimensional flat band with a width W and a centerline $C_2$, wherein the drawbead defines a curve at the intersection of the drawbead with a plane perpendicular to centerline $C_1$, wherein width W is equal to the length of the curve; and wherein centerline $C_2$ is parallel with centerline $C_1$ and is offset from centerline $C_1$ by a distance d of (W−G)/2; and
    a processor for calculating forces acting on the metal sheet at each successive state to define a next successive state;
    wherein the processor calculates a restraining force of the drawbead acting on the metal sheet in response to a predetermined function of a length of the metal sheet engaged in the flat band in respective states.

7. The simulator of claim 6 wherein the predetermined function varies between a predetermined maximum force and zero, and wherein the predetermined maximum force is determined according to material properties of the metal sheet and the stamping die and a geometry of the drawbead.

8. The simulator of claim 6 wherein the predetermined function is stored as a lookup table.

9. The simulator of claim 6 wherein the plurality of successive states includes a binderset phase and a die closure phase, and wherein the calculation of the restraining force of the drawbead acting on the metal sheet responsive to the predetermined function of the length of the metal sheet engaged in the flat band is performed in the die closure phase.

10. The simulator of claim 9 further comprising a third finite element model that models a die configuration by storing a penetration height h of the drawbead corresponding to each state in the binderset phase;
    wherein the processor calculates a restraining force of the drawbead acting on the metal sheet during the binderset phase in response to a second predetermined function of the penetration height h.

11. The simulator of claim 10 wherein the second predetermined function varies between zero and a predetermined maximum force, and wherein the predetermined maximum force is determined according to material properties of the metal sheet and the stamping die and a geometry of the drawbead.

12. The simulator of claim 11 wherein the second predetermined function is stored as a lookup table.

\* \* \* \* \*